United States Patent
Sun et al.

(10) Patent No.: US 10,580,101 B2
(45) Date of Patent: Mar. 3, 2020

(54) METHOD, DEVICE AND COMPUTER READABLE STORAGE MEDIUM FOR SCREENSHOT PROCESSING

(71) Applicant: Beijing Xiaomi Mobile Software Co., Ltd., Beijing (CN)

(72) Inventors: Mingze Sun, Beijing (CN); Yifei Pei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 137 days.

(21) Appl. No.: 15/925,369

(22) Filed: Mar. 19, 2018

(65) Prior Publication Data

US 2018/0342037 A1 Nov. 29, 2018

(30) Foreign Application Priority Data

May 25, 2017 (CN) .......................... 2017 1 0381229

(51) Int. Cl.
| | |
|---|---|
| *G06T 1/00* | (2006.01) |
| *G06F 16/955* | (2019.01) |
| *G06Q 30/06* | (2012.01) |
| *G06F 3/0481* | (2013.01) |

(52) U.S. Cl.
CPC .......... *G06T 1/0007* (2013.01); *G06F 3/0481* (2013.01); *G06F 16/9566* (2019.01); *G06Q 30/0633* (2013.01); *G06T 2200/24* (2013.01)

(58) Field of Classification Search
CPC ............... G06F 3/04842; G06F 3/0484; G06F 16/5866; G06F 3/048

USPC ........ 382/103, 190, 198, 282, 305; 358/537, 358/538, 453, 462
See application file for complete search history.

(56) References Cited

U.S. PATENT DOCUMENTS

| | | | | |
|---|---|---|---|---|
| 7,379,600 | B2 * | 5/2008 | Derks ................. | G06F 11/3692 382/218 |
| 8,013,304 | B2 * | 9/2011 | Haigh ................. | G01J 5/02 250/330 |
| 8,922,617 | B2 * | 12/2014 | Alexandrov ........... | H04N 7/155 348/14.08 |

(Continued)

FOREIGN PATENT DOCUMENTS

| | | |
|---|---|---|
| CN | 102929604 A | 2/2013 |
| CN | 105718166 A | 6/2016 |

(Continued)

OTHER PUBLICATIONS

European Extended Search Report issued in corresponding EP Patent Application No. 18173139.9, dated Oct. 22, 2018, 10 pages.

(Continued)

*Primary Examiner* — Yosef Kassa
(74) *Attorney, Agent, or Firm* — Arch & Lake LLP

(57) ABSTRACT

A method and an apparatus are provided for screenshot processing. The method includes: receiving a screenshot instruction; capturing a target image according to the screenshot instruction; acquiring interface jump information of a display interface displaying the target image, wherein the interface jump information enables the terminal to jump back to the display interface or an application containing the display interface; and storing the target image and the interface jump information correspondingly.

20 Claims, 10 Drawing Sheets

(56) References Cited

U.S. PATENT DOCUMENTS

| | | | |
|---|---|---|---|
| 9,015,037 B2 * | 4/2015 | Myslinski | G06F 17/20 |
| | | | 704/7 |
| 9,066,237 B2 * | 6/2015 | Madala | G06Q 50/01 |
| 9,148,471 B2 * | 9/2015 | Beykpour | G09B 7/00 |
| 9,269,072 B2 * | 2/2016 | Alexandrov | G06Q 10/101 |
| 2009/0199106 A1 | 8/2009 | Jonsson | |
| 2017/0212670 A1 | 7/2017 | Shimizu | |
| 2018/0247165 A1 | 8/2018 | Kim | |

FOREIGN PATENT DOCUMENTS

| | | |
|---|---|---|
| CN | 106484256 A | 3/2017 |
| CN | 106611025 A | 5/2017 |
| CN | 106648707 A | 5/2017 |
| EP | 2813957 A1 | 12/2014 |
| WO | 2016017420 A1 | 2/2016 |
| WO | 2017051953 A1 | 3/2017 |

OTHER PUBLICATIONS

First Office Action to Chinese Patent Application No. 201710381229.8, dated Nov. 26, 2019 and English translation, (23p).

* cited by examiner

METHOD, DEVICE AND COMPUTER READABLE STORAGE MEDIUM FOR SCREENSHOT PROCESSING

CROSS REFERENCE TO RELATED APPLICATION

This application bases on and claims priority to Chinese Patent Application No. 201710381229.8, filed on May 25, 2017, which is incorporated herein by reference in its entirety.

TECHNICAL FIELD

The present disclosure relates to the field of terminal technology, and more particularly, to a method, a device and a computer readable storage medium for screenshot processing.

BACKGROUND

In related arts, users are often used to save an image containing their favorite objects, so that later they can perform operations such as viewing, comparing, screening, etc. However, when a user screens out a certain favorite object from an image, if the user wants to perform a purchase operation or the like via the image containing the object, it may be required to switch to a corresponding application or open a website according to the object displayed in the image, and then conduct a number of searches so as to return to a display interface containing the image to perform the purchase operation or the like. The whole process not only involves cumbersome, time-consuming and laborious operation steps, but also undoubtedly reduces the efficiency to operate the image and increases the user's operation burden.

SUMMARY

The present disclosure provides a method, a device, and a computer readable storage medium for screenshot processing. The technical solutions are as follows.

According to a first aspect of the present disclosure, a method for screenshot processing is provided. The method includes: receiving a screenshot instruction; capturing a target image according to the screenshot instruction; acquiring interface jump information of a display interface displaying the target image, wherein the interface jump information enables the terminal to jump back to the display interface or an application containing the display interface; and storing the target image and the interface jump information correspondingly.

According to a second aspect of the present disclosure, an apparatus for screenshot processing is provided. The apparatus includes a reception module for receiving a screenshot instruction; a capture module for capturing a target image according to the screenshot instruction; a first acquisition module for acquiring interface jump information of a display interface displaying the target image, wherein the interface jump information enables the terminal to jump back to the display interface or an application containing the display interface; and a storage module for storing the target image and the interface jump information correspondingly.

According to a third aspect of the present disclosure, a device for screenshot processing is provided. The device includes a processor; and a memory for storing instructions executable by the processor, wherein the processor is configured to receive a screenshot instruction; capture a target image according to the screenshot instruction; acquire interface jump information of a display interface displaying the target image, wherein the interface jump information enables the terminal to jump back to the display interface or an application containing the display interface; and store the target image and the interface jump information correspondingly.

According to a fourth aspect of the present disclosure, a computer readable storage medium having computer instructions stored therein is provided, wherein the instructions, when executed by a processor, perform the method according to the first aspect of embodiments in the present disclosure.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

At present, users are often used to save an image containing their favorite objects, so that later they can perform operations such as viewing, comparing, screening, etc. However, when a user screens out a certain favorite object from an image, if the user wants to perform a purchase operation or the like via the image containing the object, it may be required to switch to a corresponding application or open a website according to the object displayed in the image, and then conduct a number of searches so as to return to a display interface containing the image to perform the purchase operation or the like. The whole process not only involves cumbersome, time-consuming and laborious operation steps, but also undoubtedly reduces the efficiency to operate the image and increases the user's operating burden. For example, when the user gets interested in an object B displayed on a stored image A after image comparison/screen, if the object B comes from a "certain E" platform, then it is required to exit from the image application displaying the image A and manually switch to the "certain E" application or exit from the image application displaying the image A and manually open the "certain E" website, and then conduct a number of searches in accordance with information related to the object B so as to open the interface containing the object B (which is also the display interface of the image A) to complete the purchase operation. In this process, if the input information related to the object B is not unique, it is possible that the interface containing the object B cannot be found or repeated searches may be needed before finally entering the interface containing the object B.

Figure 1:
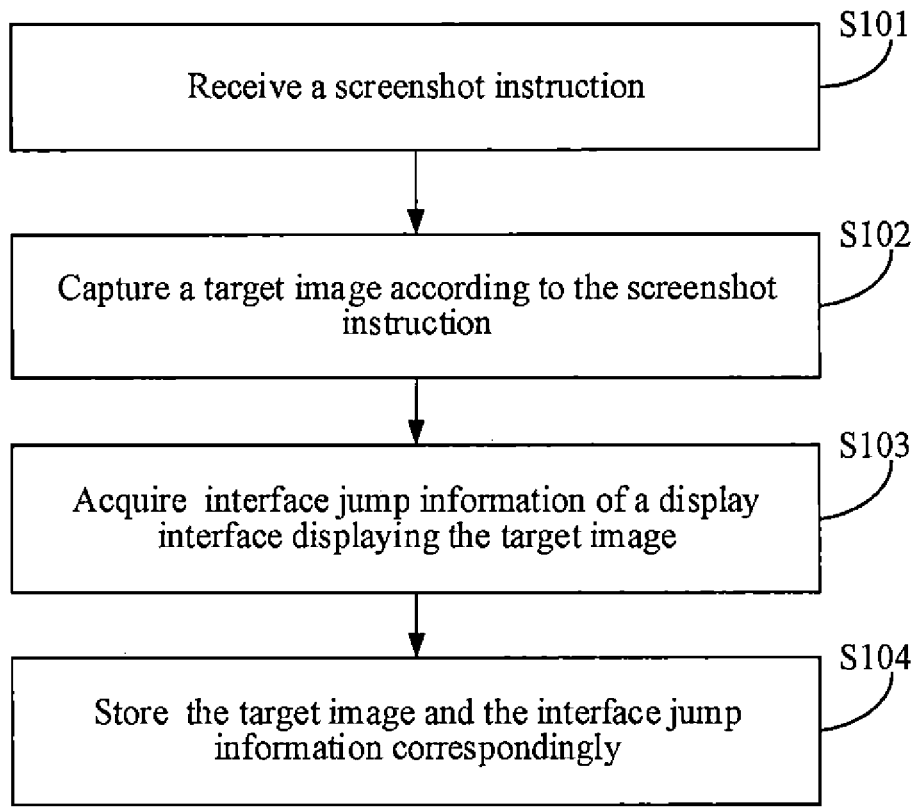
FIG. 1 is a flow chart illustrating a method for screenshot processing according to an aspect of the disclosure.

In order to solve the above problem, a method for screenshot processing is provided in one or more embodiments of the present disclosure. The method may be applied in a program, a system or a device for screenshot processing. The corresponding execution body of the method may be a terminal such as a mobile phone, a tablet phone, a computer, or the like. As shown in FIG. 1, the method may include step S101 to step S104.

In step S101, a screenshot instruction may be received. The screenshot instruction may be received by a terminal include a processor and a data storage.

Here, the screenshot instruction instructs the terminal to take a screenshot. For example, the screenshot instruction may be from a trigger to a screenshot shortcut. Alternatively, the screenshot instruction may be triggered by pressing one or more buttons on the terminal.

In step S102, a target image may be captured according to the screenshot instruction. For example, the target image currently displayed by the terminal may be captured after the screenshot instruction is triggered.

Here, an object displayed on the target image may be any object such as goods, travel products, air tickets, recipes, news, books, libraries, articles, web pages, videos, etc. For example, when a user uses the terminal to view books on a website, he may press one or more buttons on the terminal to take a screenshot of the book to buy.

In step S103, interface jump information of a display interface displaying the target image may be acquired, where the interface jump information may enable the terminal to jump back to the display interface or an application containing the display interface. Here, the interface jump information may include a link to return to the display interface that shows the target image. The terminal may use the interface jump information to jump back to the display interface or the application containing the display interface. For example, the link may include a Uniform Resource Locator (URL) address, an IP address, a HTTP link, or any other identification used to load or open the interface to show the target image.

In step S104, the target image and the interface jump information may be stored correspondingly. For example, the terminal may save the target image and the interface jump information together in a local database. Alternatively or additionally, the terminal may also send the interface jump information to a remote database with an identification code that may be used to identify the target image saved locally. Thus, when the target image is displayed, the user may return to the display interface by tapping or clicking the target image. In other words, the interface jump information is associated and/or encoded in the target image.

Upon the reception of the screenshot instruction, the target image may be captured according to the screenshot instruction, the interface jump information of the display interface displaying the target image may be automatically acquired at the same time, and the target image and the interface jump information may be stored correspondingly. Thus the user may screen out the object meeting personal requirements of the user by the way of image comparison. After that, based on the interface jump information corresponding to the image containing the object, the user may be able to automatically jump back to the display interface of the target image or at least to the application containing the displace interface of the target image so as to perform a purchase operation or the like. As a result, the image operation efficiency can be improved, and the operation steps such as manually switching, searching, etc. when the user jumps back to the display interface of the target image or the application containing the displace interface of the target image can be reduced.

Figure 2:
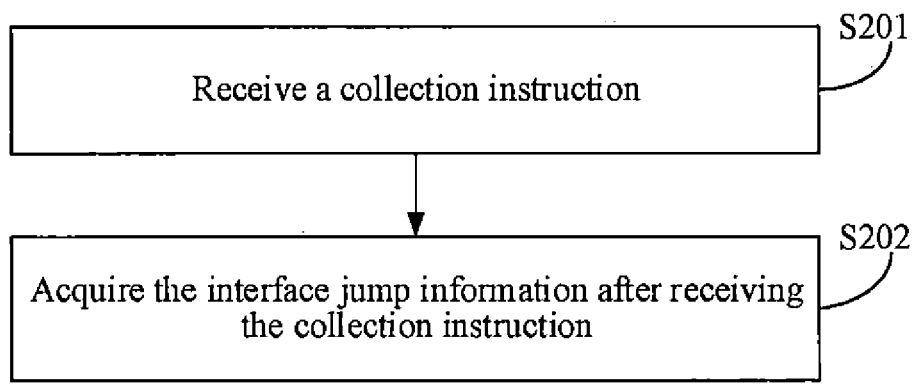
FIG. 2 is a flow chart illustrating another method for screenshot processing according to an aspect of the disclosure.

As shown in FIG. 2, in one or more embodiments, the step S103 in FIG. 1, i.e. the step of acquiring the interface jump information of the display interface displaying the target image, may include step S201 and step S202.

In step S201, a collection instruction may be received.

In step S202, the interface jump information may be acquired after receiving the collection instruction.

In the step of acquiring the interface jump information, the interface jump information may be automatically acquired in accordance with the collection instruction after receiving the collection instruction, so that subsequently an automatic jump operation can be performed in accordance with the interface jump information.

Figure 3:
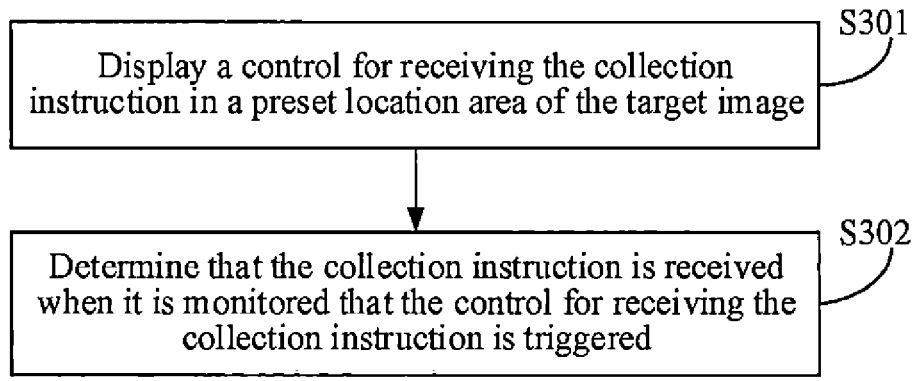
FIG. 3 is a flow chart illustrating a further method for screenshot processing according to an aspect of the disclosure.

As shown in FIG. 3, in one or more embodiments, the step S201 in FIG. 2, i.e. the step of receiving the collection instruction, may include step S301 and step S302.

In step S301, a control for receiving the collection instruction may be displayed in a preset location area of the target image.

Figure 6:
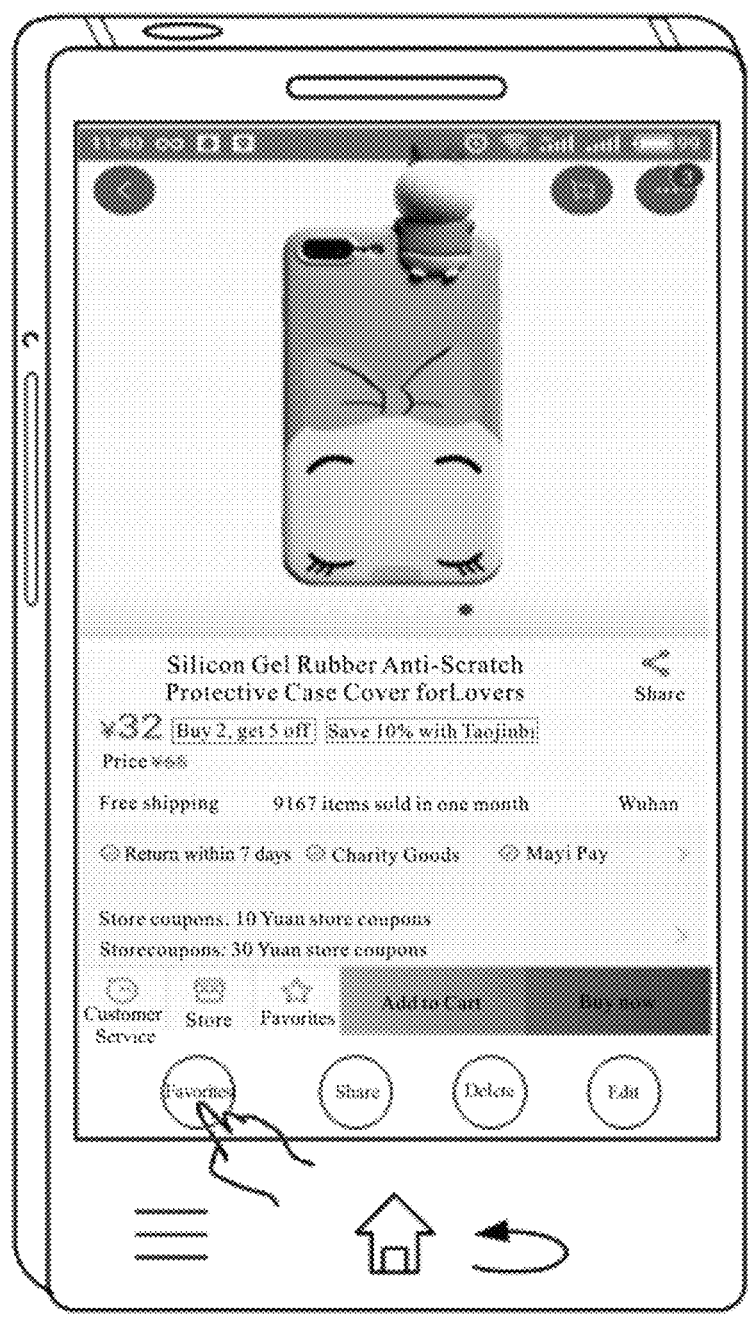
FIG. 6 is a screenshot showing controls for receiving a collection instruction according to an aspect of the disclosure.

The preset location area may be a customized area, which may be a certain area on the target image such as a bottom area of the target image or may be an area around the target image on the interface containing the target image such as an area at the left side/right side of the target image or below the target image. As shown in FIG. 6, the preset location area may be an area below the target image on the interface containing the target image. The controls in the area may include a Favorites control, a Share control, a Delete control, an Edit control.

In step S302, when it is monitored that the control for receiving the collection instruction is triggered, it may be determined that the collection instruction is received.

By displaying the control for receiving the collection instruction in the preset location area of the target image, it may be determined that the collection instruction is received when it is monitored that the control is triggered. As shown in FIG. 6, when it is monitored that the Favorites control is clicked or pressed, it may indicate that the user is expected to collect the target image, and thus it may be determined that the collection instruction is received.

Here, before the step S301 of displaying the control for receiving the collection instruction in the preset location area of the target image, the above method may further include acquiring a pre-recorded image operation record, wherein the image operation record may include at least one of a count of triggers to a preset image by the user and a trigger position of each trigger to the preset image; and determining a display position of the preset location area based on the image operation record.

Here, the preset image may be one or more images, and may be various images that has been locally stored before receiving the present collection instruction.

Different users may have different habits to operate an image, and the operation habit of the same user may also change. For example, some users may be used to click on an area at the left side of the image when operating the image, but other users may be used to click on an area below the image when operating the image. Thus, the display position of the preset location area can be determined based on the image operation record, so that the preset location area may be dynamically changed depending on the user's operation habit. As an example, when it is determined that the user recently always conducts trigger operations at the left side of a preset image according to the number of times the user triggers the preset image and the trigger position of each trigger operation on the preset image (e.g. when the number of times the trigger position is located at the left side of the preset image accounts for more than half of the total number of times the user triggers the preset image, it may be determined that the user recently always conducts trigger operations at the left side of the preset image), it may be determined that the display position of the preset location area is at the left side of the image. Accordingly, the preset location area may be moved to the left side of the target image. On the other hand, when it is determined that the user recently always conducts trigger operations below the preset image, it may be determined that the display position of the preset location area is below the image, and accordingly the preset location area may be moved below the target image or the preset location area may be automatically moved to an area below the target image on the interface containing the target image. Therefore, the image may be operated more intelligently. The preset location area may be automatically moved depending on the user's habit to operate the image.

Figure 4:
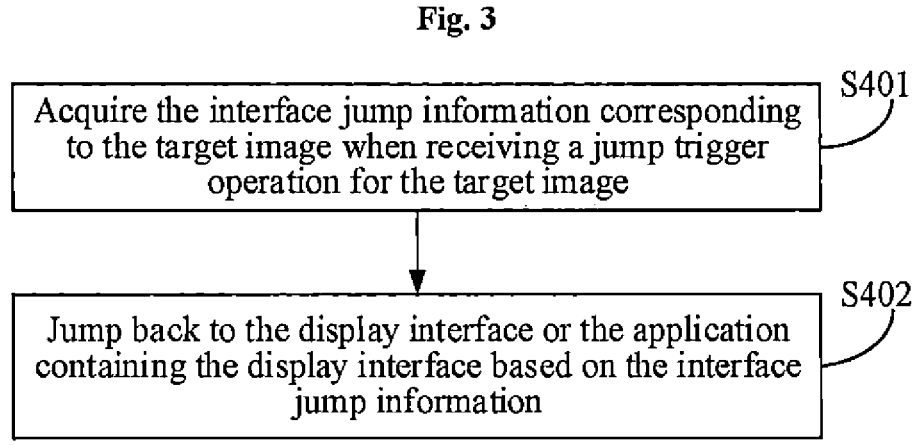
FIG. 4 is a flow chart illustrating another further method for screenshot processing according to an aspect of the disclosure.

As shown in FIG. 4, in one or more embodiments, the above method may further include acquiring the interface jump information corresponding to the target image may be acquired when receiving a jump trigger operation for the target image in step S401; and jumping back to the display interface or the application containing the display interface based on the interface jump information in step S402.

Upon receiving the jump trigger operation for the target image, the user may operate to acquire the interface jump information corresponding to the target image and then jump back to the display interface or the application containing the display interface based on the interface jump information. Thus, after conducting a quick comparison and screening for the objects according to the target image, the user may jump back to the display interface containing the desired objects or at least to the application containing the desired objects based on the interface jump information.

Here, the method may further include displaying a preset jump control at an upper layer of the target image when displaying the target image, wherein the preset jump control is used to receive the jump trigger operation.

When displaying the target image, the jump control for receiving the jump trigger operation may be displayed at the upper layer of the target image, so that the user can conveniently input the jump trigger operation via the jump control.

Here, the jump control may be a shopping control, a control for entering a shop of the application containing the display interface, a read control, or the like. As shown in FIG. 7B, the jump control may be a control of "Open the original App". Once the user performs a click operation as shown in FIG. 7B, the interface jump information corresponding to the image as shown in FIG. 7B may be acquired, and thus the jump operation may be completed.

Here, the interface jump information includes: application information of the application containing the display interface and/or an invoke address of the display interface. For example, the application information of the application containing the display interface enables the terminal to jump back to the application containing the display interface; and the invoke address of the display interface enables the terminal to jump back to the display interface. The application information may be used for jumping back to the application containing the display interface. The invoke address of the display interface may be used for jumping back to the display interface.

The interface jump information may be the invoke address of the display interface, such as a URL address of the display interface or a local open path recorded by the system and used for opening the display interface when the user enters the application containing the display interface.

The application information of the application containing the display interface is a unique identifier of the application containing the display interface, such as an application package name of the application inside the system or a shortcut icon of the application, etc.

Figure 5:
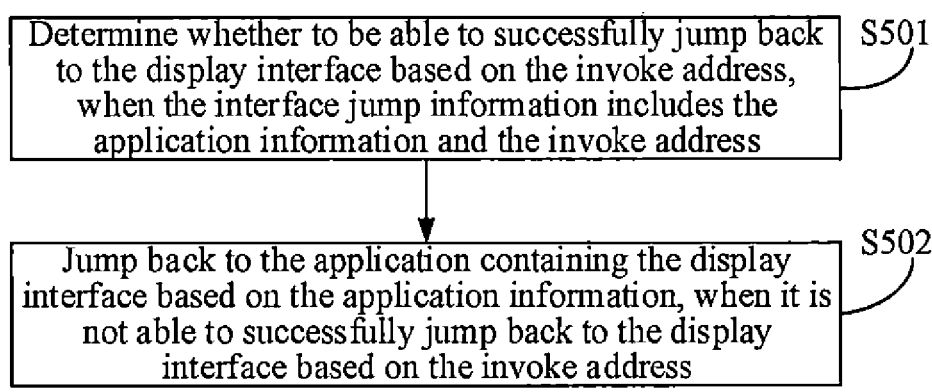
FIG. 5 is a flow chart illustrating another further method for screenshot processing according to an aspect of the disclosure.

As shown in FIG. 5, in one or more embodiments, the step S402 of FIG. 4, i.e. the step of jumping back to the display interface or the application containing the display interface based on the interface jump information, may include step S501 and step S502.

In step S501, it may be determined whether to be able to successfully jump back to the display interface based on the invoke address, when the interface jump information includes the application information and the invoke address.

In step S502, the user may jump back to the application containing the display interface based on the application information, when it is not able to successfully jump back to the display interface based on the invoke address.

When jumping back to the display interface or the application containing the display interface based on the interface jump information, it is preferred to firstly use the invoke address to determine whether to be able to successfully jump back to the display interface. When it is not able to successfully jump back to the display interface based on the invoke address, it may indicate that the invoke address has been invalid. In this case, the user may jump back to the application containing the display interface. Therefore, when performing the jump trigger operation to the target image, the user may at least jump back to the application containing the display interface to further reduce the jumping back operation of the user.

Here, when the interface jump information includes the invoke address, the acquiring the interface jump information of the display interface displaying the target image includes acquiring a URL link of the display interface; and/or acquiring a local open path of the display interface.

When acquiring the interface jump information, the URL link in the display interface and/or the local open path of the system may be automatically acquired.

In one or more embodiments, when the interface jump information includes the application information, the acquiring the interface jump information of the display interface displaying the target image includes acquiring a pre-stored application package name of the application containing the display interface.

Here, the application package name may be the name of the application in the system. For example, the application package name of Alipay may be stored as "alipay" in the system.

In one or more embodiments, when images from at least two applications are stored (i.e. there are a number of target images respectively from at least two applications), the above method further includes collectively displaying the images from at least two applications after receiving a trigger operation.

When collectively displaying the images from at least two applications, the images from at least two applications may be collectively displayed in a dedicated folder, so that the user can easily and quickly view the images from different applications without repeated switching among the applications. This is advantageous to improve the efficiency of screening objects by image comparison and especially advantageous to improve the efficiency of screening objects on different platforms by image comparison. The trigger operation may be clicking/pressing the folder, and the name of the folder may be Bookmarks, Smart Favorites or the like.

Alternatively, in order to collectively display the images, a screening field of the target image may be added in the Camera application. When the screening field is selected, the images from at least two applications that have stored the interface jump information may be screened out to be collectively displayed.

In one or more embodiments, the collectively displaying the images from at least two applications may be implemented as follows.

The images from at least two applications may be displayed by classification, based on attribute information of an object displayed in each of the images, wherein the attribute information of the object displayed in each of the images includes at least one of: a type of the object displayed in each of the images, a price range of the object displayed in each of the images, a corresponding delivery mode of the object displayed in each of the images, and a release time range of the object displayed in each of the images.

When collectively displaying the images from at least two applications, it may indicate that the user expects to view the images from at least two applications. Since there may be a large number of images to be displayed, the images from the at least two applications may be automatically displayed by classification based on the attribute information of the object displayed in each of the images. In this way, the user can view the images more intuitively. Furthermore, the user may be able to perform the comparison and screening of the objects across platforms by comparing the images, so as to determine the image containing the desired object without repeated switching among the at least two applications.

Figure 7A:
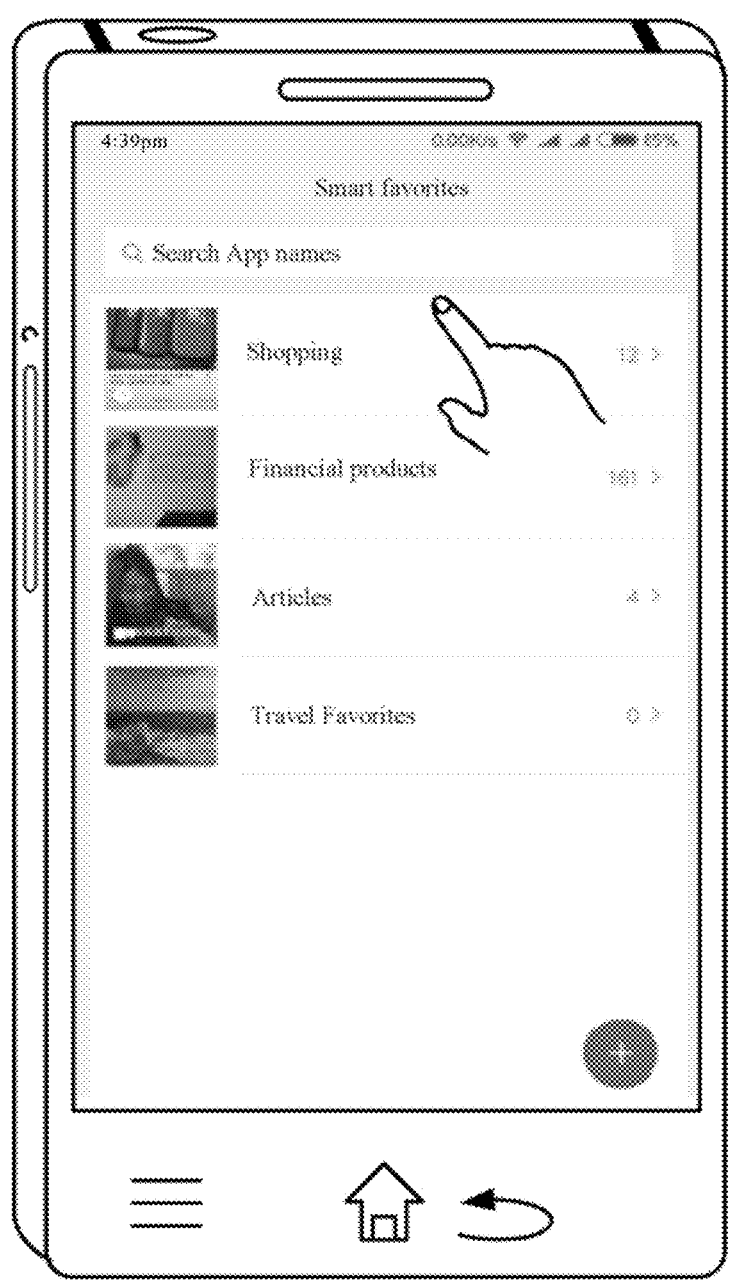
FIG. 7A is a screen shot showing the display of images from at least two applications by classification according to an aspect of the disclosure.
Figure 7B:
FIG. 7B is a screen shot showing the display of a jump control on an upper layer of a target image according to an aspect of the disclosure.

As shown in FIG. 7A, when collectively displaying the images from at least two applications, the images from the at least two applications may be automatically displayed by classification based on the class of the object displayed in the image (i.e. whether the object displayed in the image is an item to be purchased, a financial product, an article, travel information, etc.). In this way, when the user expects to view a specific image containing a certain object (e.g. an image containing a phone shell), the user may click the class of "Shopping" containing the image (as shown in FIG. 7A), then select the image containing the phone shell to enter the interface of FIG. 7B, and finally trigger the control of "Open the original App" on the image to realize the jump of the interface.

In one or more embodiments, the collectively displaying the images from at least two applications may be implemented as follows.

The images from at least two applications may be displayed by classification of the application based on the application information, when the interface jump information includes the application information of the application containing the display interface that displays the target image.

When collectively displaying the images from at least two applications, the images from at least two applications may be automatically displayed by classification of the application. In this way, the images from different applications may be separately displayed to allow the user to view the images from different applications separately.

Figure 7C:
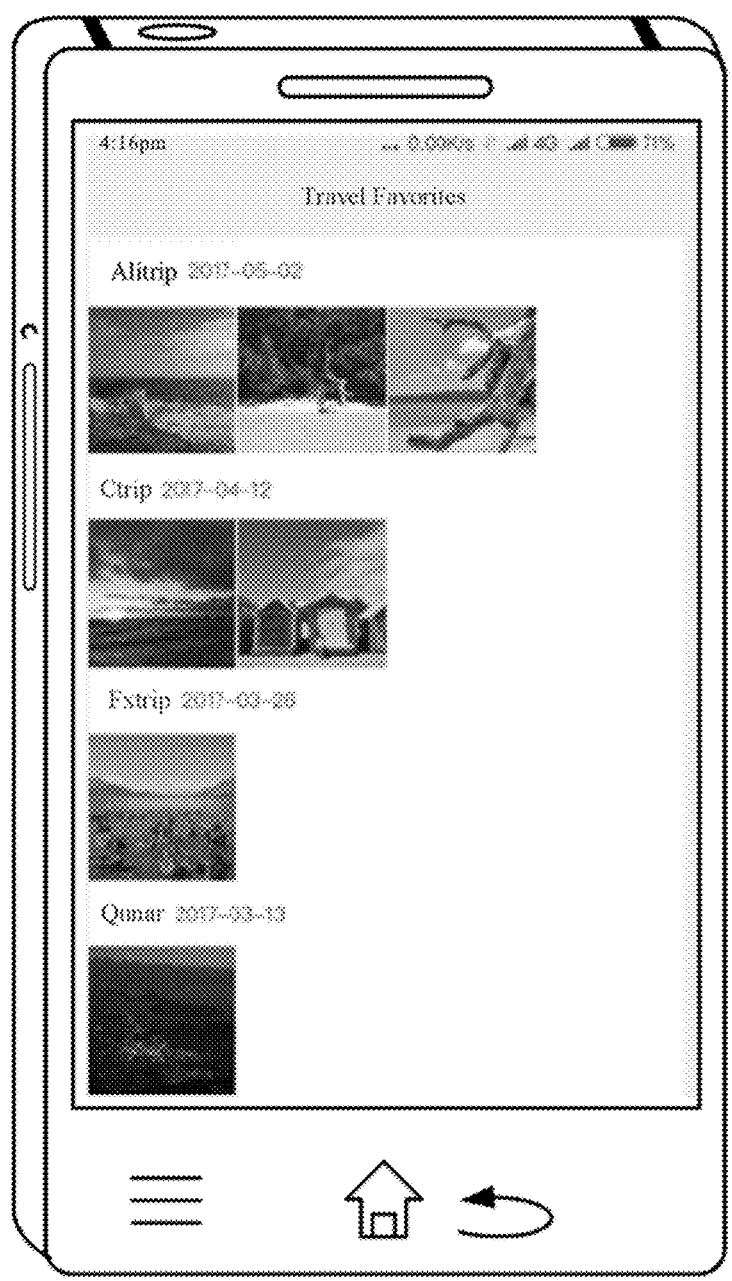
FIG. 7C is another screen shot showing the display of images from at least two applications by classification according to an aspect of the disclosure.

As shown in FIG. 7C, after entering a subfolder called Travel Favorites in the Smart Favorites of FIG. 7A, the images from at least two applications collected in the subfolder of Travel Favorites may be displayed by classification of the application. It is obvious that FIG. 7C only illustrates a kind of display by classification. It should be understood by those skilled in the art that all the collected images from all the applications may be displayed in the primary interface of the Smart Favorites by classification of the application.

Corresponding to the above method for screenshot processing provided in embodiments of the present disclosure, an apparatus for screenshot processing is also provided in embodiments of the present disclosure.

Figure 8:
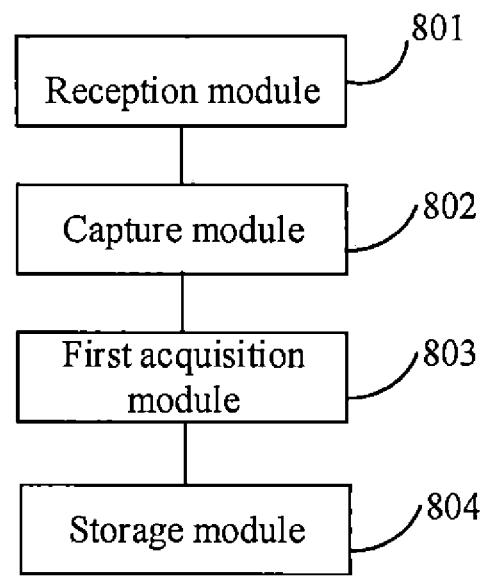
FIG. 8 is a block diagram illustrating an apparatus for screenshot processing according to an aspect of the disclosure.

As shown in FIG. 8, the apparatus may include a reception module 801 for receiving a screenshot instruction; a capture module 802 for capturing a target image according to the screenshot instruction; a first acquisition module 803 for acquiring interface jump information of a display interface displaying the target image. The interface jump information enables the terminal to jump back to the display interface or an application containing the display interface. For example, the interface jump information is used for jumping back to the display interface or an application containing the display interface. The apparatus further includes a storage module 804 for storing the target image and the interface jump information correspondingly.

Figure 9:
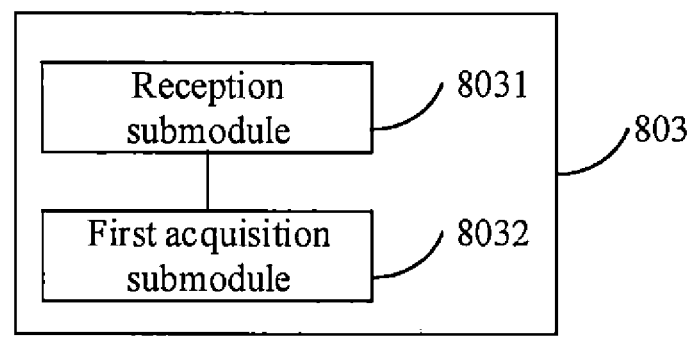
FIG. 9 is a block diagram illustrating another apparatus for screenshot processing according to an aspect of the disclosure.

As shown in FIG. 9, the first acquisition module 803 in FIG. 8 may include a reception submodule 8031 for receiving a collection instruction; a first acquisition submodule 8032 for acquiring the interface jump information after receiving the collection instruction.

Figure 10A:
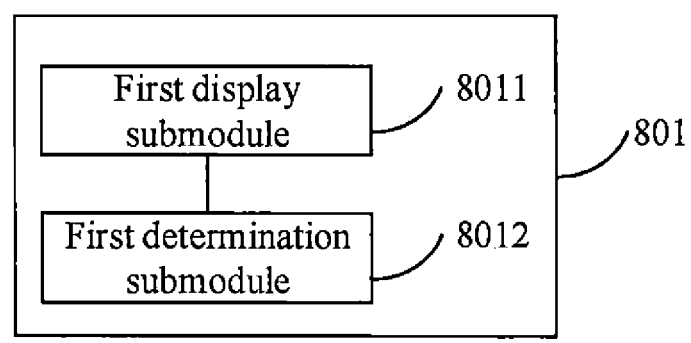
FIG. 10A is a block diagram illustrating a further apparatus for screenshot processing according to an aspect of the disclosure.

As shown in FIG. 10A, the reception module 801 may include a first display submodule 8011 for displaying a control for receiving the collection instruction in a preset location area of the target image; a first determination submodule 8012 for determining that the collection instruction is received when it is monitored that the control for receiving the collection instruction is triggered.

Figure 10B:
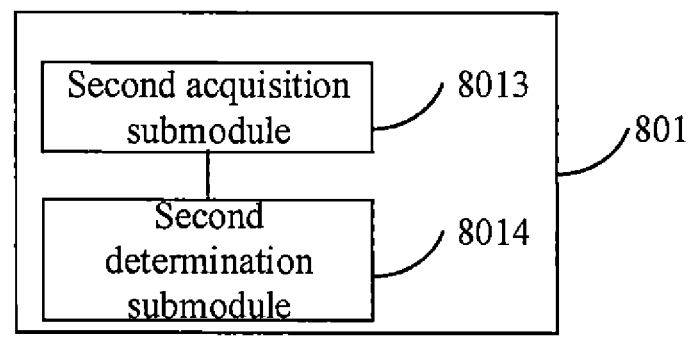
FIG. 10B is a block diagram illustrating another further apparatus for screenshot processing according to an aspect of the disclosure.

As shown in FIG. 10B, the reception module 802 may include a second acquisition submodule 8013 and a second determination submodule 8014.

The second acquisition submodule 8013 is configured to acquire a pre-recorded image operation record before displaying the control for receiving the collection instruction in the preset location area of the target image, wherein the image operation record includes at least one of a count of triggers to a preset image by the user and a trigger position of each trigger to the preset image.

The second determination submodule 8014 is configured to determine a display position of the preset location area based on the image operation record.

Figure 11:
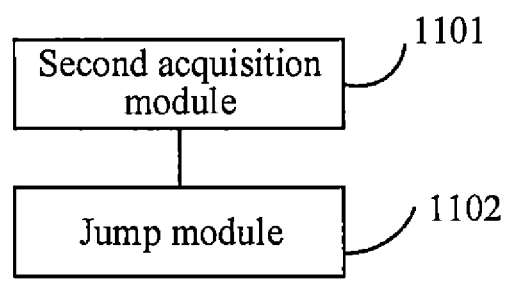
FIG. 11 is a block diagram illustrating another further apparatus for screenshot processing according to an aspect of the disclosure.

As shown in FIG. 11, the above apparatus may further include a second acquisition module 1101 for acquiring the interface jump information corresponding to the target image when receiving a jump trigger operation for the target image; and a jump module 1102 for jumping back to the display interface or the application containing the display interface based on the interface jump information.

Here, the above apparatus may further include a first display module for displaying a preset jump control at an upper layer of the target image when displaying the target image, wherein the preset jump control is used to receive the jump trigger operation.

In one or more embodiments, the interface jump information includes application information of the application containing the display interface and/or an invoke address of the display interface, wherein: the application information of the application containing the display interface is configured for jumping back to the application containing the display interface; and the invoke address of the display interface is configured for jumping back to the display interface.

Figure 12:
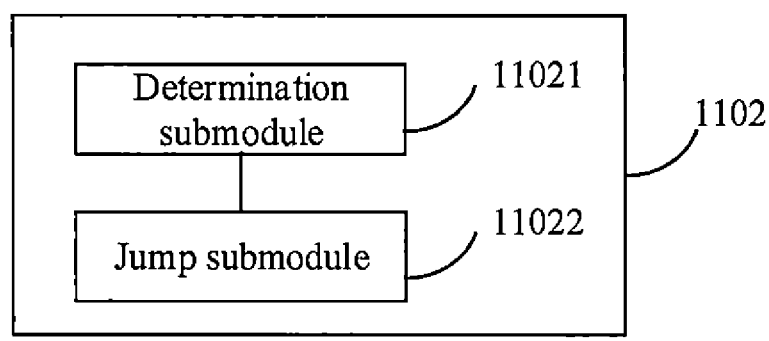
FIG. 12 is a block diagram illustrating another further apparatus for screenshot processing according to an aspect of the disclosure.

As shown in FIG. 12, the jump module 1102 may include a determination submodule 11021 for determining whether to be able to successfully jump back to the display interface based on the invoke address, when the interface jump information includes the application information and the invoke address; and a jump submodule 11022 for jumping back to the application containing the display interface based on the application information, when it is not able to successfully jump back to the display interface based on the invoke address.

Here, the first acquisition module 803 may include a third acquisition submodule for acquiring a URL link of the display interface when the interface jump information includes the invoke address; and/or a fourth acquisition submodule for acquiring a local open path of the display interface.

In one or more embodiments, the first acquisition module may include a fifth acquisition submodule for acquiring a pre-stored application package name of the application containing the display interface when the interface jump information includes the application information.

Here, the apparatus further includes a second display module for collectively displaying images from at least two applications after receiving a trigger operation, when the images from at least two applications are stored.

In one or more embodiments, the second display module includes: a second display submodule for displaying the images from at least two applications by classification, based on attribute information of an object displayed in each of the images, wherein the attribute information of the object displayed in each of the images includes at least one of: a type of the object displayed in each of the images, a price range of the object displayed in each of the images, a corresponding delivery mode of the object displayed in each of the images, and a distribution time range of the object displayed in each of the images.

In one or more embodiments, the second display module includes: a third display submodule for displaying the images from at least two applications by classification of the application based on the application information, when the interface jump information includes the application information of the application containing the display interface that displays the target image.

According to a third aspect of embodiments in the present disclosure, a device for screenshot processing is provided. The device includes a processor; and a memory for storing instructions executable by the processor, wherein the processor is configured to receive a screenshot instruction; capture a target image according to the screenshot instruction; acquire interface jump information of a display interface displaying the target image, where the interface jump information is used for jumping back to the display interface or an application containing the display interface; and store the target image and the interface jump information correspondingly. Thus, the interface jump information enables the terminal to jump back to the display interface or an application containing the display interface. For example, when the terminal receives a user input that activates the interface jump information, the terminal may jump back to the display interface or an application containing the display interface. The user input may be a touch, a click, a double click, or other acts on the target image.

The above processor may be further configured to acquire the interface jump information of the display interface displaying the target image by receiving a collection instruction; and acquiring the interface jump information after receiving the collection instruction.

The above processor may be further configured to receive the collection instruction by displaying a control for receiving the collection instruction in a preset location area of the target image; and determining that the collection instruction is received when it is monitored that the control for receiving the collection instruction is triggered.

Before displaying the control for receiving the collection instruction in the preset location area of the target image, the above processor may be further configured to acquire a pre-recorded image operation record, wherein the image operation record includes at least one of a count of triggers to a preset image by the user and a trigger position of each trigger to the preset image; and determine a display position of the preset location area based on the image operation record.

The above processor may be further configured to acquire the interface jump information corresponding to the target image when receiving a jump trigger operation for the target image; and jump back to the display interface or the application containing the display interface based on the interface jump information.

The above processor may be further configured to display a preset jump control at an upper layer of the target image when displaying the target image, wherein the preset jump control is used to receive the jump trigger operation.

The above processor may be further configured to make the interface jump information include application information of the application containing the display interface and/or an invoke address of the display interface, where the application information of the application containing the display interface enables the terminal to jump back to the application containing the display interface; and the invoke address of the display interface enables the terminal to jump back to the display interface. Thus, the application information is used for jumping back to the application containing the display interface; and the invoke address of the display interface is used for jumping back to the display interface.

The above processor may be further configured to jump back to the display interface or the application containing the display interface based on the interface jump information by determining whether to be able to successfully jump back to the display interface based on the invoke address, when the interface jump information includes the application information and the invoke address; and jumping back to the application containing the display interface based on the application information, when it is not able to successfully jump back to the display interface based on the invoke address.

The above processor may be further configured in such a way that when the interface jump information includes the invoke address, the acquiring the interface jump information of the display interface displaying the target image includes acquiring a URL link of the display interface; and/or acquiring a local open path of the display interface.

The above processor may be further configured in such a way that when the interface jump information includes the application information, the acquiring the interface jump information of the display interface displaying the target image includes acquiring a pre-stored application package name of the application containing the display interface.

The above processor may be further configured to collectively display images from at least two applications after receiving a trigger operation when the images from the at least two applications are stored.

The above processor may be further configured to collectively display the images from the at least two applications by displaying the images from the at least two applications by classification based on attribute information of an object displayed in each of the images, wherein the attribute information of the object displayed in each of the images includes at least one of: a type of the object displayed in each of the images, a price range of the object displayed in each of the images, a corresponding delivery mode of the object displayed in each of the images, and a release time range of the object displayed in each of the images.

The above processor may be further configured to collectively display the images from the at least two applications by displaying the images from the at least two applications by classification of the application based on the application information, when the interface jump information includes the application information of the application containing the display interface that displays the target image.

Figure 13:
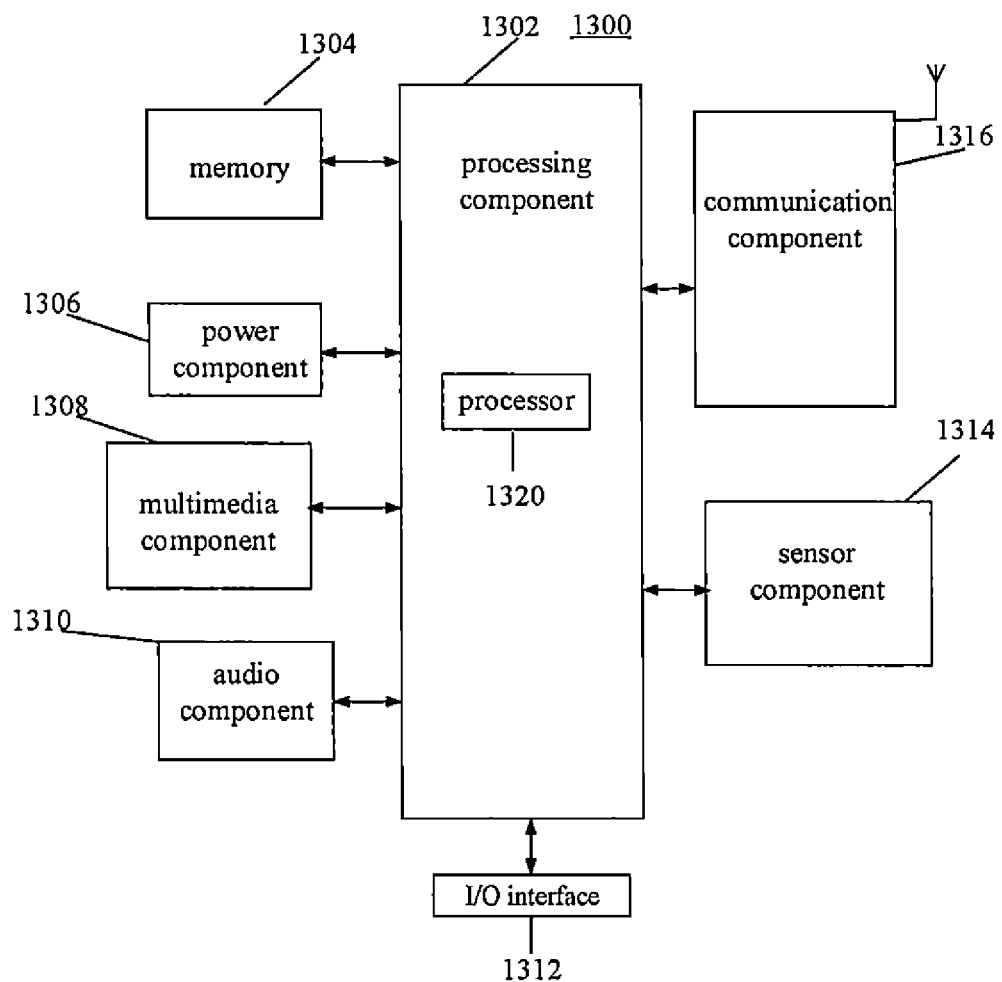
FIG. 13 is a block diagram illustrating a device for screenshot processing according to an aspect of the disclosure.

FIG. 13 is a block diagram illustrating a device 1300 for screenshot processing according to an aspect of the disclosure. For example, the device 1300 may be a mobile phone, a computer, a digital broadcasting terminal, a message transceiver, a game console, a tablet device, medical equipment, fitness equipment, a personal digital assistant or the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support operations of the device 1300. Examples of such data may include instructions for any stored objects or methods operated on the device 1300, contact data, phonebook data, messages, pictures, videos, etc. The memory 1304 may be implemented using any type of volatile or non-volatile storages, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a Complementary Metal Oxide Semiconductor (CMOS) or Charge-coupled Device (CCD) image sensor, for use in imaging applications. In some embodiments, the sensor component 1314 may also include an accelerometer sensor, a gyroscope sensor, a magnetic sensor, a distance sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In an aspect of the disclosure, the communication component 1316 receives a broadcast signal or broadcast associated information from an external broadcast management system via a broadcast channel. In an aspect of the disclosure, the communication component 1316 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In aspect of the disclosures, the device 1300 may be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In aspect of the disclosures, there is also provided a non-transitory computer-readable storage medium including instructions, such as the memory 1304 including instructions executable by the processor 1320 in the device 1300 to perform the above-described methods. For example, the non-transitory computer-readable storage medium may be a Random Only Memory (ROM), a Random Access Memory (RAM), a Compact Disc Read-Only Memory (CD-ROM), a magnetic tape, a floppy disc, an optical data storage device, and the like.

A non-transitory computer readable storage medium may be provided. When computer instructions in the storage medium are executed by a processor of the above device 1300, the above device 1300 may be able to perform a method for screenshot processing. The method includes: receiving a screenshot instruction; capturing a target image according to the screenshot instruction; acquiring interface jump information of a display interface displaying the target image, wherein the interface jump information enables the terminal to jump back to the display interface or an application containing the display interface; and storing the target image and the interface jump information correspondingly.

Here, the acquiring the interface jump information of the display interface displaying the target image includes receiving a collection instruction; and acquiring the interface jump information after receiving the collection instruction.

For example, the receiving the collection instruction includes displaying a control for receiving the collection instruction in a preset location area of the target image; determining that the collection instruction is received when it is monitored that the control for receiving the collection instruction is triggered.

In one or more embodiments, before displaying the control for receiving the collection instruction in the preset location area of the target image, the method further includes acquiring a pre-recorded image operation record, wherein the image operation record includes at least one of a count of triggers to a preset image by the user and a trigger position of each trigger to the preset image; and determining a display position of the preset location area based on the image operation record.

In one or more embodiments, the method further includes acquiring the interface jump information corresponding to the target image when receiving a jump trigger operation for the target image; jumping back to the display interface or the application containing the display interface based on the interface jump information.

In one or more embodiments, the method further includes displaying a preset jump control at an upper layer of the target image when displaying the target image, wherein the preset jump control is used to receive the jump trigger operation.

In one or more embodiments, the interface jump information includes application information of the application containing the display interface and/or an invoke address of the display interface, where the application information of the application containing the display interface enables the terminal to jump back to the application containing the display interface; and the invoke address of the display interface enables the terminal to jump back to the display interface.

In one or more embodiments, the jumping back to the display interface or the application containing the display interface based on the interface jump information includes determining whether to be able to successfully jump back to the display interface based on the invoke address, when the interface jump information includes the application information and the invoke address; and jumping back to the application containing the display interface based on the application information, when it is not able to successfully jump back to the display interface based on the invoke address.

In one or more embodiments, when the interface jump information includes the invoke address, the acquiring the interface jump information of the display interface displaying the target image includes acquiring a URL link of the display interface; and/or acquiring a local open path of the display interface.

In one or more embodiments, when the interface jump information includes the application information, the acquiring the interface jump information of the display interface displaying the target image includes acquiring a pre-stored application package name of the application containing the display interface.

In one or more embodiments, when images from at least two applications are stored, the method further includes collectively displaying the images from at least two applications after receiving a trigger operation.

In one or more embodiments, the collectively displaying the images from the at least two applications includes displaying the images from the at least two applications by classification, based on attribute information of an object displayed in each of the images, wherein the attribute information of the object displayed in each of the images includes at least one of: a type of the object displayed in each of the images, a price range of the object displayed in each of the images, a corresponding delivery mode of the object displayed in each of the images, and a release time range of the object displayed in each of the images.

In one or more embodiments, the collectively displaying the images from the at least two applications includes displaying the images from the at least two applications by classification of the application based on the application information, when the interface jump information includes the application information of the application containing the display interface that displays the target image.

Other embodiments of the invention will be apparent to those skilled in the art from consideration of the specification and practice of the invention disclosed here. This application is intended to cover any variations, uses, or adaptations of the disclosure following general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for screenshot processing, comprising:
   receiving a screenshot instruction by a terminal include a processor and a data storage;
   capturing a target image currently displayed by the terminal according to the screenshot instruction;
   acquiring interface jump information of a display interface displaying the target image, wherein the interface jump information enables the terminal to jump back to the display interface or an application containing the display interface; and
   storing the target image and the interface jump information correspondingly.

2. The method of claim 1, wherein acquiring the interface jump information of the display interface displaying the target image comprises:
   receiving a collection instruction; and
   acquiring the interface jump information after receiving the collection instruction.

3. The method of claim 2, wherein receiving the collection instruction comprises:
   displaying a control for receiving the collection instruction in a preset location area of the target image; and
   determining that the collection instruction is received when it is monitored that the control for receiving the collection instruction is triggered.

4. The method of claim 3, wherein before displaying the control for receiving the collection instruction in the preset location area of the target image, the method further comprises:
   acquiring a pre-recorded image operation record, wherein the image operation record comprises at least one operation record of following: a count of triggers to a preset image by a user and a trigger position of each trigger to the preset image; and
   determining a display position of the preset location area based on the image operation record.

5. The method of claim 1, further comprising:
   acquiring the interface jump information corresponding to the target image when receiving a jump trigger operation for the target image; and
   jumping back to the display interface or the application containing the display interface based on the interface jump information.

6. The method of claim 5, further comprising:
   displaying a preset jump control at an upper layer of the target image when displaying the target image, wherein the preset jump control is used to receive the jump trigger operation.

7. The method of claim 5, wherein the interface jump information comprises: application information of the application containing the display interface and/or an invoke address of the display interface, wherein:
   the application information of the application containing the display interface enables the terminal to jump back to the application containing the display interface; and
   the invoke address of the display interface enables the terminal to jump back to the display interface.

8. The method of claim 7, wherein the jumping back to the display interface or the application containing the display interface based on the interface jump information comprises:
   determining whether to be able to successfully jump back to the display interface based on the invoke address, when the interface jump information comprises the application information and the invoke address; and
   jumping back to the application containing the display interface based on the application information, when it is not able to successfully jump back to the display interface based on the invoke address.

9. The method of claim 7, wherein when the interface jump information comprises the invoke address, the acquiring the interface jump information of the display interface displaying the target image comprises:
   acquiring a URL link of the display interface; and/or
   acquiring a local open path of the display interface.

10. The method of claim 7, wherein when the interface jump information comprises the application information, the acquiring the interface jump information of the display interface displaying the target image comprises:
    acquiring a pre-stored application package name of the application containing the display interface.

11. The method of claim 1, wherein when images from at least two applications are stored, the method further comprises:
    collectively displaying the images from the at least two applications after receiving a trigger operation.

12. The method of claim 11, wherein the collectively displaying the images from the at least two applications comprises:

displaying the images from the at least two applications by classification, based on attribute information of an object displayed in each of the images, wherein the attribute information of the object displayed in each of the images comprises at least one property of following properties:

a type of the object displayed in each of the images, a price range of the object displayed in each of the images, a corresponding delivery mode of the object displayed in each of the images, and a release time range of the object displayed in each of the images.

13. The method of claim 11, wherein the collectively displaying the images from the at least two applications comprises:

displaying the images from the at least two applications by classification of the application based on application information, when the interface jump information comprises the application information of the application containing the display interface that displays the target image.

14. A device for screenshot processing, comprising:
a processor; and
a memory for storing instructions executable by the processor,
wherein the processor is configured to:
receive a screenshot instruction;
capture a target image according to the screenshot instruction;
acquire interface jump information of a display interface displaying the target image, wherein the interface jump information enables the device to jump back to the display interface or an application containing the display interface; and
store the target image and the interface jump information correspondingly.

15. The device of claim 14, wherein the processor is further configured to:
receive a collection instruction; and
acquire the interface jump information after receiving the collection instruction.

16. The device of claim 14, wherein the processor is further configured to:

acquire the interface jump information corresponding to the target image when receiving a jump trigger operation for the target image; and
jump back to the display interface or the application containing the display interface based on the interface jump information.

17. The device of claim 16, wherein the processor is further configured to:
display a preset jump control at an upper layer of the target image when displaying the target image, wherein the preset jump control is used to receive the jump trigger operation.

18. The device of claim 16, wherein the interface jump information comprises: application information of the application containing the display interface and/or an invoke address of the display interface, wherein:
the application information of the application containing the display interface enables the device to jump back to the application containing the display interface; and
the invoke address of the display interface enables the device to jump back to the display interface.

19. The device of claim 14, wherein the processor is further configured to:
collectively display images from at least two applications after receiving a trigger operation, when the images from the at least two applications are stored.

20. A non-transitory computer readable storage medium having computer instructions stored therein, wherein the instructions, when executed by a processor, cause the processor to:
receive a screenshot instruction by a terminal including a processor and the non-transitory computer readable storage accessible to the processor;
capture a target image currently displayed by the terminal according to the screenshot instruction;
acquire interface jump information of a display interface displaying the target image, wherein the interface jump information enables the terminal to jump back to the display interface or an application containing the display interface; and
store the target image and the interface jump information correspondingly.

* * * * *